(12) United States Patent
Bredt et al.

(10) Patent No.: US 7,550,518 B2
(45) Date of Patent: Jun. 23, 2009

(54) METHODS AND COMPOSITIONS FOR THREE-DIMENSIONAL PRINTING OF SOLID OBJECTS

(75) Inventors: James F. Bredt, Watertown, MA (US); Sarah L. Clark, Somerville, MA (US); Evert F. Uy, Rockville, MD (US); Matthew J. DiCologero, Baldwinville, MA (US); Timothy Anderson, Cambridge, MA (US); Michael Tarkanian, Brockton, MA (US); Derek X. Williams, Berwick, ME (US)

(73) Assignee: Z Corporation, Burlington, MA (US)

( * ) Notice: Subject to any disclaimer, the term of this patent is extended or adjusted under 35 U.S.C. 154(b) by 640 days.

(21) Appl. No.: 11/068,487

(22) Filed: Feb. 28, 2005

(65) Prior Publication Data

US 2005/0197431 A1    Sep. 8, 2005

Related U.S. Application Data (62) Division of application No. 09/835,292, filed on Apr. 13, 2001, now abandoned.

(60) Provisional application No. 60/197,118, filed on Apr. 14, 2000, provisional application No. 60/197,526, filed on Apr. 14, 2000.

(51) Int. Cl.
| C09D 11/00 | (2006.01) |
| C09D 11/10 | (2006.01) |
| C08L 101/10 | (2006.01) |
| B29C 65/48 | (2006.01) |

(52) U.S. Cl. .................. 523/160; 523/161; 264/109; 264/113; 264/122; 264/123; 264/128; 106/162.9; 106/287.1

(58) Field of Classification Search .............. 106/162.9, 106/204.1, 287.1; 264/123, 128, 113, 109, 264/122; 523/160, 161
See application file for complete search history.

(56) References Cited

U.S. PATENT DOCUMENTS

| 2,522,548 A | 9/1950 | Streicher |
| 2,662,024 A | 12/1953 | Riddell et al. |
| 3,297,601 A | 1/1967 | Maynard et al. |
| 3,303,147 A | 2/1967 | Elden |
| 3,309,328 A | 3/1967 | Carroll et al. |
| 3,476,190 A | 11/1969 | Jenny et al. |
| 3,525,632 A | 8/1970 | Enoch |
| 3,821,006 A | 6/1974 | Schwartz |
| 3,835,074 A | 9/1974 | Desmarais |
| 3,852,083 A | 12/1974 | Yang |
| 3,870,538 A | 3/1975 | Burkard et al. |
| 3,890,305 A | 6/1975 | Weber et al. |
| 3,926,870 A | 12/1975 | Keegan et al. |
| 3,930,872 A | 1/1976 | Toeniskoetter et al. |
| 3,932,923 A | 1/1976 | DiMatteo |
| 4,041,476 A | 8/1977 | Swainson |
| 4,042,408 A | 8/1977 | Murray et al. |
| 4,078,229 A | 3/1978 | Swanson et al. |
| 4,247,508 A | 1/1981 | Housholder |
| 4,288,861 A | 9/1981 | Swainson et al. |
| 4,310,996 A | 1/1982 | Mulvey et al. |
| 4,327,156 A | 4/1982 | Dillon et al. |
| 4,369,025 A | 1/1983 | von der Weid |
| 4,443,392 A | 4/1984 | Becker et al. |
| 4,444,594 A | 4/1984 | Paddison et al. |
| 4,476,190 A | 10/1984 | Clarke et al. |
| 4,575,330 A | 3/1986 | Hull |
| 4,613,627 A | 9/1986 | Sherman et al. |
| 4,618,390 A | 10/1986 | Powell |
| 4,649,077 A | 3/1987 | Lauchenauer et al. |
| 4,665,492 A | 5/1987 | Masters |
| 4,752,352 A | 6/1988 | Feygin |
| 4,752,498 A | 6/1988 | Fudim |
| 4,755,227 A | 7/1988 | Sherif et al. |
| 4,758,278 A | 7/1988 | Tomic |
| 4,801,477 A | 1/1989 | Fudim |
| 4,844,144 A | 7/1989 | Murphy et al. |
| 4,863,538 A | 9/1989 | Deckard |
| 4,929,402 A | 5/1990 | Hull |

(Continued)

FOREIGN PATENT DOCUMENTS

| CN | 1810492 | 8/2006 |
| CN | 1857930 | 11/2006 |
| DE | 40 12 044 A | 10/1991 |
| DE | 197 27 677 | 1/1999 |
| DE | 198 53 834 | 5/2000 |

(Continued)

OTHER PUBLICATIONS

Patent Abstracts of Japan, vol. 1998, No. 1 (Jan. 30, 1998), JP 09241311A.
Examination report for European patent Application No. 01 927 008.1, mailed Jan. 23, 2008, 7 pages.
International Preliminary Report on Patentability for Intl. Application No. PCT/US2004/027549 (Dec. 6, 2007).

(Continued)

*Primary Examiner*—Kriellion A Sanders
(74) *Attorney, Agent, or Firm*—Goodwin Procter LLP (57) ABSTRACT

A three-dimensional printing materials system and method can produce both appearance models and small numbers of functional parts in an office environment. The method can include building cross-sectional portions of a three-dimensional article, and assembling the individual cross-sectional areas in a layer-wise fashion to form a final article. The individual cross-sectional areas can be built by using an ink-jet printhead to deliver an aqueous solvent or binder to an adhesive particulate mixture, causing the particles of the mixture to adhere together, and to previous cross-sectional areas. The binder can include at least one of nonaqueous organic monomeric compound, anionically ionizable polymer, cationic polymer, polymer, waterborne colloid, or inorganic solute.

7 Claims, 2 Drawing Sheets

U.S. PATENT DOCUMENTS

| | | |
|---|---|---|
| 4,938,816 A | 7/1990 | Beaman et al. |
| 4,940,412 A | 7/1990 | Blumenthal et al. |
| 4,942,001 A | 7/1990 | Murphy et al. |
| 4,942,003 A | 7/1990 | Bold |
| 4,942,060 A | 7/1990 | Grossa et al. |
| 4,943,928 A | 7/1990 | Campbell et al. |
| 4,944,817 A | 7/1990 | Bourell et al. |
| 4,945,032 A | 7/1990 | Murphy et al. |
| 4,961,154 A | 10/1990 | Pomerantz et al. |
| 4,996,010 A | 2/1991 | Modrek |
| 4,996,282 A | 2/1991 | Noren et al. |
| 4,999,143 A | 3/1991 | Hull et al. |
| 5,009,585 A | 4/1991 | Hirano et al. |
| 5,011,635 A | 4/1991 | Murphy et al. |
| 5,015,312 A | 5/1991 | Kinzie |
| 5,015,424 A | 5/1991 | Smalley |
| 5,017,317 A | 5/1991 | Marcus |
| 5,017,753 A | 5/1991 | Deckard |
| 5,031,120 A | 7/1991 | Pomerantz et al. |
| 5,038,014 A | 8/1991 | Pratt et al. |
| 5,040,005 A | 8/1991 | Davidson et al. |
| 5,051,334 A | 9/1991 | Fan |
| 5,053,090 A | 10/1991 | Beaman et al. |
| 5,058,988 A | 10/1991 | Spence |
| 5,059,021 A | 10/1991 | Spence et al. |
| 5,059,266 A | 10/1991 | Yamane et al. |
| 5,059,359 A | 10/1991 | Hull et al. |
| 5,071,337 A | 12/1991 | Heller et al. |
| 5,071,503 A | 12/1991 | Berman et al. |
| 5,076,869 A | 12/1991 | Bourell et al. |
| 5,076,974 A | 12/1991 | Modrek et al. |
| 5,088,047 A | 2/1992 | Bynum |
| 5,089,184 A | 2/1992 | Hirano et al. |
| 5,089,185 A | 2/1992 | Hirano et al. |
| 5,094,935 A | 3/1992 | Vassiliou et al. |
| 5,096,491 A | 3/1992 | Nagai et al. |
| 5,096,530 A | 3/1992 | Cohen |
| 5,104,592 A | 4/1992 | Hull et al. |
| 5,106,288 A | 4/1992 | Hughes et al. |
| 5,121,329 A | 6/1992 | Crump |
| 5,122,441 A | 6/1992 | Lawton et al. |
| 5,123,734 A | 6/1992 | Spence et al. |
| 5,127,037 A | 6/1992 | Bynum |
| 5,128,235 A | 7/1992 | Vassiliou et al. |
| 5,130,064 A | 7/1992 | Smalley et al. |
| 5,132,143 A | 7/1992 | Deckard |
| 5,133,987 A | 7/1992 | Spence et al. |
| 5,134,569 A | 7/1992 | Masters |
| 5,135,379 A | 8/1992 | Fudim |
| 5,135,695 A | 8/1992 | Marcus |
| 5,137,662 A | 8/1992 | Hull et al. |
| 5,139,338 A | 8/1992 | Pomerantz et al. |
| 5,139,711 A | 8/1992 | Nakamura et al. |
| 5,141,680 A | 8/1992 | Almquist et al. |
| 5,143,663 A | 9/1992 | Leyden et al. |
| 5,143,817 A | 9/1992 | Lawton et al. |
| 5,147,587 A | 9/1992 | Marcus et al. |
| 5,149,548 A | 9/1992 | Yamane et al. |
| 5,151,813 A | 9/1992 | Yamamoto et al. |
| 5,154,762 A | 10/1992 | Mitra et al. |
| 5,155,321 A | 10/1992 | Grube et al. |
| 5,155,324 A | 10/1992 | Deckard et al. |
| 5,157,423 A | 10/1992 | Zur et al. |
| 5,158,858 A | 10/1992 | Lawton et al. |
| 5,164,882 A | 11/1992 | Kanai et al. |
| 5,167,882 A | 12/1992 | Jacobine et al. |
| 5,169,579 A | 12/1992 | Marcus et al. |
| 5,171,490 A | 12/1992 | Fudim |
| 5,173,220 A | 12/1992 | Reiff et al. |
| 5,174,931 A | 12/1992 | Almquist et al. |
| 5,174,943 A | 12/1992 | Hull |
| 5,175,077 A | 12/1992 | Grossa et al. |
| 5,176,188 A | 1/1993 | Quinn et al. |
| 5,182,055 A | 1/1993 | Allison et al. |
| 5,182,056 A | 1/1993 | Spence et al. |
| 5,182,134 A | 1/1993 | Sato |
| 5,182,715 A | 1/1993 | Vorgitch et al. |
| 5,183,598 A | 2/1993 | Helle et al. |
| 5,184,307 A | 2/1993 | Hull et al. |
| 5,192,469 A | 3/1993 | Smalley et al. |
| 5,192,559 A | 3/1993 | Hull et al. |
| 5,198,159 A | 3/1993 | Nakamura et al. |
| 5,203,944 A | 4/1993 | Prinz et al. |
| 5,204,055 A * | 4/1993 | Sachs et al. ..................... 419/2 |
| 5,204,124 A | 4/1993 | Secretan et al. |
| 5,204,823 A | 4/1993 | Schlotterbeck |
| 5,207,371 A | 5/1993 | Prinz et al. |
| 5,209,878 A | 5/1993 | Smalley et al. |
| 5,216,616 A | 6/1993 | Masters |
| 5,217,653 A | 6/1993 | Mashinsky et al. |
| 5,234,636 A | 8/1993 | Hull et al. |
| 5,236,637 A | 8/1993 | Hull |
| 5,236,812 A | 8/1993 | Vassiliou et al. |
| 5,238,614 A | 8/1993 | Uchinono et al. |
| 5,238,639 A | 8/1993 | Vinson et al. |
| 5,247,180 A | 9/1993 | Mitcham et al. |
| 5,248,249 A | 9/1993 | Yamamoto et al. |
| 5,248,456 A | 9/1993 | Evans, Jr. et al. |
| 5,252,264 A | 10/1993 | Forderhase et al. |
| 5,256,340 A | 10/1993 | Allison et al. |
| 5,258,146 A | 11/1993 | Almquist et al. |
| 5,260,009 A | 11/1993 | Penn |
| 5,263,130 A | 11/1993 | Pomerantz et al. |
| 5,264,061 A | 11/1993 | Juskey et al. |
| 5,267,013 A | 11/1993 | Spence |
| 5,273,691 A | 12/1993 | Hull et al. |
| 5,278,442 A | 1/1994 | Prinz et al. |
| 5,279,665 A | 1/1994 | Yunovich et al. |
| 5,281,789 A | 1/1994 | Merz et al. |
| 5,286,573 A | 2/1994 | Prinz et al. |
| 5,287,435 A | 2/1994 | Cohen et al. |
| 5,289,214 A | 2/1994 | Zur et al. |
| 5,296,062 A | 3/1994 | Bourell et al. |
| 5,296,335 A | 3/1994 | Thomas et al. |
| 5,301,415 A | 4/1994 | Prinz et al. |
| 5,303,141 A | 4/1994 | Batchelder et al. |
| 5,306,446 A | 4/1994 | Howe |
| 5,306,447 A | 4/1994 | Marcus et al. |
| 5,316,580 A | 5/1994 | Deckard |
| 5,328,539 A | 7/1994 | Sato |
| 5,338,611 A | 8/1994 | Lause et al. |
| 5,340,433 A | 8/1994 | Crump |
| 5,340,656 A | 8/1994 | Sachs et al. |
| 5,342,566 A | 8/1994 | Schäfer et al. |
| 5,342,919 A | 8/1994 | Dickens et al. |
| 5,344,298 A | 9/1994 | Hull |
| 5,345,391 A | 9/1994 | Hull et al. |
| 5,345,414 A | 9/1994 | Nakamura et al. |
| 5,348,693 A | 9/1994 | Taylor et al. |
| 5,352,310 A | 10/1994 | Natter |
| 5,352,405 A | 10/1994 | Beaman et al. |
| 5,355,318 A | 10/1994 | Dionnet et al. |
| 5,358,673 A | 10/1994 | Heller et al. |
| 5,364,889 A | 11/1994 | Quinn et al. |
| 5,365,996 A | 11/1994 | Crook |
| 5,370,692 A | 12/1994 | Fink et al. |
| 5,376,320 A | 12/1994 | Tiefenbacher et al. |
| 5,382,289 A | 1/1995 | Bambauer et al. |
| 5,382,308 A | 1/1995 | Bourell et al. |
| 5,385,772 A | 1/1995 | Slovinsky et al. |
| 5,386,500 A | 1/1995 | Pomerantz et al. |
| 5,387,380 A | 2/1995 | Cima et al. |
| 5,391,072 A | 2/1995 | Lawton et al. |
| 5,391,460 A | 2/1995 | Dougherty et al. |

| | | | | | |
|---|---|---|---|---|---|
| 5,393,613 A | 2/1995 | MacKay | 5,605,941 A | 2/1997 | Steinmann et al. |
| 5,402,351 A | 3/1995 | Batchelder et al. | 5,608,814 A | 3/1997 | Gilmore et al. |
| 5,415,820 A | 5/1995 | Furuta et al. | 5,609,812 A | 3/1997 | Childers et al. |
| 5,418,112 A | 5/1995 | Mirle et al. | 5,609,813 A | 3/1997 | Allison et al. |
| 5,426,722 A | 6/1995 | Batchelder | 5,610,824 A | 3/1997 | Vinson et al. |
| 5,429,788 A | 7/1995 | Ribble et al. | 5,611,883 A | 3/1997 | Tompkins et al. |
| 5,429,908 A | 7/1995 | Hokuf et al. | 5,614,075 A | 3/1997 | Andre, Sr. |
| 5,430,666 A | 7/1995 | DeAngelis et al. | 5,616,293 A | 4/1997 | Ashtiani-Zarandi et al. |
| 5,432,045 A | 7/1995 | Narukawa et al. | 5,616,294 A | 4/1997 | Deckard |
| 5,433,280 A | 7/1995 | Smith | 5,622,577 A | 4/1997 | O'Connor |
| 5,435,902 A | 7/1995 | Andre, Sr. | 5,622,811 A | 4/1997 | Ogue et al. |
| 5,437,964 A | 8/1995 | Lapin et al. | 5,626,919 A | 5/1997 | Chapman et al. |
| 5,439,622 A | 8/1995 | Pennisi et al. | 5,630,981 A | 5/1997 | Hull |
| 5,447,822 A | 9/1995 | Hull et al. | 5,632,848 A | 5/1997 | Richards et al. |
| 5,450,205 A | 9/1995 | Sawin et al. | 5,633,021 A | 5/1997 | Brown et al. |
| 5,458,825 A | 10/1995 | Grolman et al. | 5,637,169 A | 6/1997 | Hull et al. |
| 5,460,758 A | 10/1995 | Langer et al. | 5,637,175 A | 6/1997 | Feygin et al. |
| 5,461,088 A | 10/1995 | Wolf et al. | 5,639,070 A | 6/1997 | Deckard |
| 5,468,886 A | 11/1995 | Steinmann et al. | 5,639,402 A | 6/1997 | Barlow et al. |
| 5,470,689 A | 11/1995 | Wolf et al. | 5,639,413 A | 6/1997 | Crivello |
| 5,474,719 A | 12/1995 | Fan et al. | 5,640,667 A | 6/1997 | Freitag et al. |
| 5,482,659 A | 1/1996 | Sauerhoefer | 5,641,448 A | 6/1997 | Yeung et al. |
| 5,490,882 A | 2/1996 | Sachs et al. | 5,645,973 A | 7/1997 | Hofmann et al. |
| 5,490,962 A | 2/1996 | Cima et al. | 5,648,450 A | 7/1997 | Dickens et al. |
| 5,491,643 A | 2/1996 | Batchelder | 5,649,277 A | 7/1997 | Greul et al. |
| 5,494,618 A | 2/1996 | Sitzmann et al. | 5,650,260 A | 7/1997 | Onishi et al. |
| 5,495,029 A | 2/1996 | Steinmann et al. | 5,651,934 A | 7/1997 | Almquist et al. |
| 5,495,328 A | 2/1996 | Spence et al. | 5,653,925 A | 8/1997 | Batchelder |
| 5,498,782 A | 3/1996 | Rex | 5,656,230 A | 8/1997 | Khoshevis |
| 5,500,069 A | 3/1996 | Ogue et al. | 5,658,412 A | 8/1997 | Retallick et al. |
| 5,501,824 A | 3/1996 | Almquist et al. | 5,658,712 A | 8/1997 | Steinmann et al. |
| 5,503,785 A | 4/1996 | Crump et al. | 5,659,478 A | 8/1997 | Pennisi et al. |
| 5,503,793 A | 4/1996 | Uchinono et al. | 5,660,621 A | 8/1997 | Bredt |
| 5,506,046 A | 4/1996 | Andersen et al. | 5,660,900 A | 8/1997 | Andersen et al. |
| 5,506,087 A | 4/1996 | Lapin et al. | 5,663,883 A | 9/1997 | Thomas et al. |
| 5,506,607 A | 4/1996 | Sanders, Jr. et al. | 5,665,401 A | 9/1997 | Serbin et al. |
| 5,507,336 A | 4/1996 | Tobin | 5,667,820 A | 9/1997 | Heller et al. |
| 5,510,226 A | 4/1996 | Lapin et al. | 5,672,312 A | 9/1997 | Almquist et al. |
| 5,512,162 A | 4/1996 | Sachs et al. | 5,674,921 A | 10/1997 | Regula et al. |
| 5,514,232 A | 5/1996 | Burns | 5,676,904 A | 10/1997 | Almquist et al. |
| 5,514,378 A | 5/1996 | Mikos et al. | 5,677,107 A | 10/1997 | Neckers |
| 5,518,680 A | 5/1996 | Cima et al. | 5,684,713 A | 11/1997 | Asada et al. |
| 5,519,816 A | 5/1996 | Pomerantz et al. | 5,688,464 A | 11/1997 | Jacobs et al. |
| 5,525,051 A | 6/1996 | Takano et al. | 5,693,144 A | 12/1997 | Jacobs et al. |
| 5,527,877 A | 6/1996 | Dickens et al. | 5,695,707 A | 12/1997 | Almquist et al. |
| 5,534,059 A | 7/1996 | Immordino, Jr. | 5,697,043 A | 12/1997 | Baskaran et al. |
| 5,534,104 A | 7/1996 | Langer et al. | 5,698,485 A | 12/1997 | Bruck et al. |
| 5,536,467 A | 7/1996 | Reichle et al. | 5,700,406 A | 12/1997 | Menhennett et al. |
| 5,545,367 A | 8/1996 | Bae et al. | 5,703,138 A | 12/1997 | Cantor et al. |
| 5,554,336 A | 9/1996 | Hull | 5,705,116 A | 1/1998 | Sitzmann et al. |
| 5,555,176 A | 9/1996 | Menhennett et al. | 5,705,117 A | 1/1998 | O'Connor et al. |
| 5,555,481 A | 9/1996 | Rock et al. | 5,705,316 A | 1/1998 | Steinmann et al. |
| 5,556,590 A | 9/1996 | Hull | 5,707,578 A | 1/1998 | Johnson et al. |
| 5,569,349 A | 10/1996 | Almquist et al. | 5,707,780 A | 1/1998 | Lawton et al. |
| 5,569,431 A | 10/1996 | Hull | 5,711,911 A | 1/1998 | Hull |
| 5,571,471 A | 11/1996 | Hull | 5,713,410 A | 2/1998 | LaSalle et al. |
| 5,572,431 A | 11/1996 | Brown et al. | 5,717,599 A | 2/1998 | Menhennett et al. |
| 5,573,721 A | 11/1996 | Gillette | 5,718,279 A | 2/1998 | Satoh et al. |
| 5,573,722 A | 11/1996 | Hull | 5,718,757 A | 2/1998 | Guillou et al. |
| 5,573,889 A | 11/1996 | Hofmann et al. | 5,727,138 A | 3/1998 | Harada et al. |
| 5,582,876 A | 12/1996 | Langer et al. | 5,728,345 A | 3/1998 | Hlavaty et al. |
| 5,587,913 A | 12/1996 | Abrams et al. | 5,730,817 A | 3/1998 | Feygin et al. |
| 5,591,563 A | 1/1997 | Suzuki et al. | 5,730,925 A | 3/1998 | Mattes et al. |
| 5,593,531 A | 1/1997 | Penn | 5,731,388 A | 3/1998 | Suzuki et al. |
| 5,594,652 A | 1/1997 | Penn et al. | 5,733,497 A | 3/1998 | McAlea et al. |
| 5,595,597 A | 1/1997 | Fogel et al. | 5,738,817 A | 4/1998 | Danforth et al. |
| 5,595,703 A | 1/1997 | Swaelens et al. | 5,738,921 A | 4/1998 | Andersen et al. |
| 5,596,504 A | 1/1997 | Tata et al. | 5,740,051 A | 4/1998 | Sanders, Jr. et al. |
| 5,597,520 A | 1/1997 | Smalley et al. | 5,746,844 A | 5/1998 | Sterett et al. |
| 5,597,589 A | 1/1997 | Deckard | 5,746,967 A | 5/1998 | Hoy et al. |
| 5,598,340 A | 1/1997 | Medard et al. | 5,749,041 A | 5/1998 | Lakshminarayan et al. |
| 5,599,651 A | 2/1997 | Steinmann et al. | 5,753,171 A | 5/1998 | Serbin et al. |
| 5,603,797 A | 2/1997 | Thomas et al. | 5,753,274 A | 5/1998 | Wilkening et al. |

| | | | | | | |
|---|---|---|---|---|---|---|
| 5,772,947 | A | 6/1998 | Hull et al. | EP | 0 540 203 | 5/1993 |
| 5,783,358 | A | 7/1998 | Schulthess et al. | EP | 1 226 019 B1 | 7/2002 |
| 5,805,971 | A | 9/1998 | Akedo | EP | 1475221 A | 11/2004 |
| 5,851,465 | A | 12/1998 | Bredt | EP | 1491517 | 12/2004 |
| 5,870,307 | A | 2/1999 | Hull et al. | EP | 1498277 A | 1/2005 |
| 5,902,441 | A * | 5/1999 | Bredt et al. ............ 156/284 | EP | 1512519 A | 3/2005 |
| 5,902,537 | A | 5/1999 | Almquist et al. | EP | 1623816 | 2/2006 |
| 5,940,674 | A | 8/1999 | Sachs et al. | GB | 2048235 A | 12/1980 |
| 5,943,235 | A | 8/1999 | Earl et al. | GB | 2155944 A | 10/1985 |
| 5,965,776 | A | 10/1999 | Leppard et al. | JP | 3-287683 A | 12/1991 |
| 5,976,339 | A | 11/1999 | André | JP | 06 289612 A | 10/1994 |
| 6,007,318 | A | 12/1999 | Russell et al. | JP | 11-116875 A | 4/1999 |
| 6,077,887 | A | 6/2000 | Thuresson et al. | JP | 2001-162351 | 6/2001 |
| 6,112,109 | A | 8/2000 | D'Urso | WO | WO-93/19019 A | 9/1993 |
| 6,136,088 | A | 10/2000 | Farrington | WO | WO 93/25336 | 12/1993 |
| 6,136,948 | A | 10/2000 | Dickens, Jr. et al. | WO | WO-94/12328 A | 6/1994 |
| 6,147,138 | A | 11/2000 | Höchsmann et al. | WO | WO 95/30503 | 11/1995 |
| 6,193,922 | B1 | 2/2001 | Ederer | WO | WO-96/06881 | 3/1996 |
| 6,299,677 | B1 | 10/2001 | Johnson et al. | WO | WO-97/11835 A | 4/1997 |
| 6,348,679 | B1 | 2/2002 | Ryan et al. | WO | WO 97/26302 | 7/1997 |
| 6,363,606 | B1 | 4/2002 | Johnson, Jr. et al. | WO | WO/98/09798 | 3/1998 |
| 6,375,874 | B1 | 4/2002 | Russell et al. | WO | WO 98/09798 * | 3/1998 |
| 6,397,922 | B1 | 6/2002 | Sachs et al. | WO | WO 98/28124 | 7/1998 |
| 6,403,002 | B1 | 6/2002 | van der Geest | WO | WO 00/26026 | 5/2000 |
| 6,416,850 | B1 | 7/2002 | Bredt et al. | WO | WO 01/34371 | 5/2001 |
| 6,423,255 | B1 | 7/2002 | Hoechsmann et al. | WO | WO-02/38677 | 5/2002 |
| 6,433,038 | B1 | 8/2002 | Tanabe et al. | WO | WO-02/064354 | 8/2002 |
| 6,531,086 | B1 | 3/2003 | Larsson et al. | WO | WO-03/016030 | 2/2003 |
| 6,540,784 | B2 | 4/2003 | Barlow et al. | WO | WO-2004/048463 | 6/2004 |
| 6,600,142 | B2 | 7/2003 | Ryan et al. | WO | WO-2004062927 | 7/2004 |
| 6,610,429 | B2 | 8/2003 | Bredt et al. | WO | WO-2004096514 | 11/2004 |
| 6,713,125 | B1 | 3/2004 | Sherwood et al. | WO | WO-2005/011959 | 2/2005 |
| 6,742,456 | B1 | 6/2004 | Kasperchik et al. | WO | WO-2005023524 | 3/2005 |
| 6,780,368 | B2 | 8/2004 | Liu et al. | WO | WO-2005025074 | 3/2005 |
| 6,799,959 | B1 | 10/2004 | Tochimoto et al. | WO | WO-2005/090055 | 9/2005 |
| 6,930,144 | B2 | 8/2005 | Oriakhi | WO | WO-2005/105412 | 11/2005 |
| 6,989,115 | B2 | 1/2006 | Russell et al. | WO | WO-2007039450 | 4/2007 |
| 7,037,382 | B2 | 5/2006 | Davidson et al. | WO | WO-2007-147625 | 12/2007 |
| 7,087,109 | B2 | 8/2006 | Bredt et al. | | | |
| 7,120,512 | B2 | 10/2006 | Kramer et al. | | | |
| 7,285,234 | B2 | 10/2007 | Pfeifer et al. | | | |
| 7,300,613 | B2 | 11/2007 | Sano et al. | | | |
| 2001/0050031 | A1 | 12/2001 | Bredt et al. | | | |
| 2002/0016387 | A1 | 2/2002 | Shen | | | |
| 2002/0106412 | A1 | 8/2002 | Rowe et al. | | | |
| 2003/0090034 | A1 | 5/2003 | Mulhaupt et al. | | | |
| 2003/0143268 | A1 | 7/2003 | Pryce Lewis et al. | | | |
| 2003/0173695 | A1 | 9/2003 | Monkhouse et al. | | | |
| 2004/0038009 | A1 | 2/2004 | Leyden et al. | | | |
| 2004/0056378 | A1 | 3/2004 | Bredt et al. | | | |
| 2004/0062814 | A1 | 4/2004 | Rowe et al. | | | |
| 2004/0232583 | A1 | 11/2004 | Monsheimer et al. | | | |
| 2005/0001356 | A1 | 1/2005 | Tochimoto et al. | | | |
| 2005/0003189 | A1 | 1/2005 | Bredt et al. | | | |
| 2005/0017394 | A1 | 1/2005 | Hochsmann et al. | | | |
| 2005/0059757 | A1 | 3/2005 | Bredt et al. | | | |
| 2005/0093194 | A1 | 5/2005 | Oriakhi et al. | | | |
| 2005/0110177 | A1 | 5/2005 | Schulman et al. | | | |
| 2005/0179167 | A1 | 8/2005 | Hachikian | | | |
| 2005/0212163 | A1 | 9/2005 | Bausinger et al. | | | |
| 2005/0230870 | A1 | 10/2005 | Oriakhi | | | |
| 2006/0071367 | A1 | 4/2006 | Hunter et al. | | | |
| 2006/0141145 | A1 | 6/2006 | Davidson et al. | | | |
| 2006/0208388 | A1 | 9/2006 | Bredt et al. | | | |
| 2006/0230984 | A1 | 10/2006 | Bredt et al. | | | |
| 2007/0007698 | A1 | 1/2007 | Sano | | | |
| 2007/0029698 | A1 | 2/2007 | Rynerson et al. | | | |

FOREIGN PATENT DOCUMENTS

| | | |
|---|---|---|
| DE | 101 58 233 | 3/2003 |
| EP | 0 431 924 | 6/1991 |
| EP | 0 509 523 | 10/1992 |

OTHER PUBLICATIONS

Office Action in Japanese Patent Application No. 549079/98, mailed Nov. 27, 2007, 3 pages.
Borland, "Characterization of Fundamental and Reticulated Biomedical Polymer Structures Fabricated by Three Dimensional Printing," Thesis, MIT, Jun. 1995.
Ederer, "A 3D Print Process for Inexpensive Plastic Parts," Presentation for the Austin Solid Freeform Conference, 1995.
German, *Powder Injection Molding*, (1990), pp. 32-43 and 92-95.
International Preliminary Examination Report for PCT/US01/12220, dated Mar. 14, 2003, 2 pgs.
International Search Report for PCT/US01/12220, dated Dec. 11, 2001, 7 pgs.
Khanuja, "Origin and Control of Anisotropy in Three Dimensional Printing of Structural Ceramics," Thesis, MIT, Feb. 1996.
Aranson et al., The Physics of Granular Media, pp. 143-164, Hinrichsen & Wolf, eds. (Wiley-VCH 2004).
Das, Advanced Soil Mechanics, pp. 313-326 (Hemisphere Press Press 1997).
Definition of "Colorant," Hawley's Condensed Chemical Dictionary, 14th Ed. (2001) p. 287.
Invitation to Pay Additional Fees & Partial ISR for PCT/US2007/008046, Sep. 18, 2007 (6 pages).
International Search Report & Written Opinion for PCT/US2007/008046, Nov. 15, 2007, 23 pages.
Boyer et al., eds., "Metals Handbook," American Society for Metals, pp. 23.5, 23.8-23.13, (1985).
European Search Report for 03029489.6, Feb. 16, 2004, 3 pages.
European Search Report for European Application No. 04 00 1558, Apr. 27, 2006, 5 pages.
Examination report for European patent Application No.00 976 896. 1-2307, Jan. 28, 2003 (5 pages).

Examination report in Canadian Patent Application No. 2,338,617, mailed Aug. 17, 2007 (2 pages).
Grant, Julius, Editor, "Hackh's Chemical Dictionary" Fourth Edition (1972, McGraw-Hill Book Company, New York), p. 250, "ethyl acetate."
International Preliminary Examination Report for PCT/US97/15041, Oct. 19, 1998, 9 pages.
International Preliminary Report on Patentability, Application No. PCT/US2004/015644, Dec. 8, 2005, 7 pages.
International Search Report and Written Opinion for PCT/US2004/027549.
International Search Report for PCT/US97/15041, Jan. 12, 1998, 5 pages.
International Search Report for PCT/US99/20628, Jan. 21, 2000, 3 pages.
International search Report of Int'l Application No. PCT/US04/015644, Oct. 24, 2005.
Office Action in the The People's Republic of China, Application No. 200480018360, Oct. 13, 2006, 5 pages.
Official Action from Canadian Intellectual Property Office for Canadian Application Serial No. 2,388,046, dated Apr. 10, 2006.
Written Opinion for PCT/US99/20628, Jul. 27, 2000, 10 pages.
International Search Report for PCT/US03/29714, Feb. 10, 2004, 6 pages.
Adamson, Physical Chemistry of Surfaces, Interscience Publishers, Inc. (1967).
Brandup et al., Polymer Handbook, pp. 675-714, John Wiley & Sons (1999).
Hamill, Search Report dated Jan. 4, 2008, 3 pages.
Hamill, Search Report dated Jan. 30, 2008, 2 pages.
International Search Report & Written Opinion for PCT/US2007/025075, mailed Jun. 12, 2008.
International Search Report & Written Opinion for PCT/US2008/000366, mailed Jun. 20, 2008.
http://toxics.usgs.gov/definitions/kow.html printed Jun. 24, 2008.
http://www.devicelink.com/mddi/archive/99/09/006.html printed Jun. 24, 2008.
http://www.cibasc.com/brightening.htm printed Jun. 24, 2008.
Pizzi et al., *Handbook of Adhesive Technology*, pp. 761-773, Marcel Dekker, Inc. (2003).
Rulison, "Wettability Studies for Porous Solids Including Powders and Fibrous Materials-Technical Notice # 302," (1996).
Knapczyk, "Polyallyl Glycidyl Ether Resins for Very Fast Curing High Performance Coatings," 65th Ann. Meeting of Feder. of Soc. for Coating Tech., Oct. 1987, 16 pages.
US 4,937,420, 06/1990, Deckard (withdrawn)

* cited by examiner

METHODS AND COMPOSITIONS FOR THREE-DIMENSIONAL PRINTING OF SOLID OBJECTS

RELATED APPLICATIONS

This application is a divisional application of, incorporates by reference in its entirety, and claims priority from U.S. application Ser. No. 09/835,292 filed Apr. 13, 2001, which claims priority from U.S. Provisional Application Nos. 60/197,118 and 60/197,526, both filed Apr. 14, 2000.

This application is related to U.S. application Ser. No. 09/234,349, filed Jan. 20, 1999, which is a divisional application of U.S. Pat. No. 5,902,441, issued May 11, 1999, and to U.S. application Ser. No. 09/416,787, which is a continuation-in-part of U.S. Pat. No. 6,007,318. The teachings of each of these references are incorporated herein by reference in their entirety.

BACKGROUND

Rapid prototyping involves the production of prototype articles and small quantities of functional parts, as well as structural ceramics and ceramic shell molds for metal casting, directly from computer-generated design data. There are a variety of methods to form a three-dimensional article including a selective laser-sintering process as described in U.S. Pat. No. 4,863,568, which is incorporated herein by reference.

Three-dimensional printing is a process invented by Sachs et al. at Massachusetts Institute of Technology in the early 1980's. In accordance with the process, an ink-jet printhead is used to deposit a liquid ink or binder onto a print plane composed of a powdered receiving medium. The combination of liquid binder and solid powder solidifies to form a finished article.

U.S. Pat. No. 5,204,055, incorporated herein by reference, describes an early three-dimensional printing technique that involves the use of an ink-jet printing head to deliver a liquid or colloidal binder material to layers of powdered material. The three-dimensional inkjet printing technique (hereafter "liquid-binder method") involves applying a layer of a powdered material to a surface using a counter roller. After the powdered material is applied to the surface, the ink-jet printhead delivers a liquid binder to the layer of powder. The binder infiltrates into gaps in the powder material, hardening to bond the powder material into a solidified layer. The hardened binder also bonds each layer to the previous layer. After the first cross-sectional portion is formed, the previous steps are repeated, building successive cross-sectional portions until the final article is formed. Optionally, the binder can be suspended in a carrier that evaporates, leaving the hardened binder behind. The powdered material can be ceramic, metal, plastic or a composite material, and can also include fiber. The liquid-binder material can be organic or inorganic. Typical organic binder materials used are polymeric resins, or ceramic precursors such as polycarbosilazane. Inorganic binders are used where the binder is incorporated into the final articles; silica is typically used in such an application.

In the technology of ink-jet printing, there are a number of different types of printheads distinguished by the mechanism by which ink is ejected onto the printing plane. The two broadest classes of printheads are called, "continuous-jet" and "drop-on-demand." In a continuous-jet printhead, a liquid ink or binder is projected continuously through a nozzle. To print segmented lines, the jet is deflected alternatively onto the print plane or in to a collector that masks the printing plane. In a drop-on-demand printhead, ink or binder is ejected when it is needed by sending an impulse, most usually electrical, that causes an actuator in the printhead to eject a droplet of ink or binder onto the print plane.

SUMMARY

The use of liquid-binder printing techniques with a thermal (bubble) printhead can present reliability problem associated with the spray nozzle becoming clogged with the binder material. Clogging can occur when binders having high levels of solids are used. The problem with clogging requires frequent interruptions of the build in order to clean the spray nozzle; this problem also increases the time and labor required to build parts and to maintain the equipment. Therefore, although the liquid-binder printing technique represents an advance in speed and cost over the selective laser-sintering process, it suffers from reliability problems that slow down the build rate, increasing labor and equipment maintenance costs. This problem interferes with the potential speed advantage of increased printing capability presented by the plurality of spray nozzles.

The materials for fabricating three-dimensional objects lead to a materials system and method that produce both appearance models and small numbers of functional parts in an office environment. The materials system can include at least one solid filler and a liquid binder composition. Particular binder compositions can be effectively deposited using an electromechanical printhead having suitable components. The fabrication methods can be quick, reliable, safe, and inexpensive.

An article can be made of a mixture of particles including adhesive and at least one filler. The adhesive may be activated by a fluid including a solvent. Optionally, the binder can also include various processing aids or additions that modify the working properties of the fluid and adhesive or that enhance the mechanical properties of the finished article. The mixture of particles can also optionally include particles of fiber and various processing aids. The activated adhesive causes the filler particles to adhere together, and to adhere to previously formed adjacent layers. Adhesive can be supplied to the article by coating it on the fiber and/or filler, by directly mixing it with the fiber and filler before delivering the fluid and/or by dissolving or mixing the adhesive in the fluid before the fluid is delivered to the mixture of particles.

A particular method for producing such articles can include applying a layer of the above-mentioned mixture onto a flat surface that can be indexed downward. Cross-sectional portions of an article can be defined by delivering an activating fluid, the adhesive, to the layer of the mixture of particles in a predetermined two-dimensional pattern. The fluid activates the adhesive, and the activated adhesive causes the particles to adhere together in an essentially solid layer. After the first cross-sectional portion of the article is formed, the movable surface can be indexed downward by an amount corresponding to the desired layer thickness. Successive layers of the mixture of particles are applied to previous layers in the same manner. Application of the fluid using an electromechanical ink-jet print head follows the application of each successive layer of the mixture of particulate material.

Depositing a layer of the mixture of particulate material and delivering the fluid to the layer can be repeated until the required number of cross-sectional portions have been built, completing formation of the article. After formation of the article has been completed, it typically remains immersed in a bed of unbound particulate material, where it can remain until the article is completely dry. Delicate features of the article remain supported by the unbound particulate material while drying. The finished article can then be removed from the bed of unbound particulate material and any excess unbound particulate material clinging to the finished article can be removed by a suitable cleaning process. For example, excess powder can be removed by vacuuming it off the article, by blowing it off the article, and by brushing to remove any powder left in crevices. In addition, the finished article can be placed in an oven for more rapid drying.

After cleaning, optional post-processing actions can include heat-treating, resin or wax infiltration, painting and sanding. Heat treating and infiltration can increase the strength and durability of the finished article. Infiltration can reduce porosity, making the article water resistant and more readily sanded. Painting the article can provide a more aesthetically pleasing appearance, and may also contribute to the strength and water resistance of the final articles. Sanding improves the surface smoothness, reducing any surface irregularities caused, for example, by fiber penetrating through the surface. Parts can be glued or fastened, or used as patterns for subsequent molding operations.

Various materials systems and methods offer the advantages of being able to fabricate relatively complex shapes reliably, quickly, safely and inexpensively compared to the selective laser-sintering and liquid-binder methods. Because various materials used in the present system present little or no problems with clogging, higher reliability can be offered relative to prior art methods, particularly prior art methods in which high levels of suspended solids are contained in the binder. The higher reliability results in reduced build times compared with prior art methods. Further, embodiments can be made and practiced more economically than prior art methods because inexpensive equipment and materials can be used, and the high reliability associated with materials and methods reduces cost even further. In addition, because non-toxic materials can be used, these methods can be carried out safely in a typical office environment.

Additionally, the use of electromechanical ink-jet printheads to deliver the fluid compositions allows for the incorporation of thermally-sensitive adhesives in the fluid due to the fact that electromechanical ink-jet printheads typically operate at ambient-temperature. Further, fluids with a large amount of dissolved or suspended solids subject to degradation with temperature excursions can likewise be better accommodated by an electromechanical printhead relative to a thermal printhead. The use of fluids with higher solids content with an electromechanical printhead further allows for the formation of materials that will shrink less (due to fewer escaping components) and that have higher strength and greater dimensional stability than materials formed with more dilute binders. Further still, the incorporation of adhesives in the activating fluid and the delivery of that fluid to the particulate bed allows for an increased amount of adhesive to be incorporated into the final part.

The composition selectively adhere particulate material to form a solid object in a three-dimensional printer. In one embodiment, the composition comprises a nonaqueous organic monomeric compound. That compound can include at least one of an alcohol, an ester, an ether, a silane, a vinyl monomer, an acrylic monomer, or a methacrylate monomer.

The composition can include a solvent and a solute, and in one embodiment, the compound is the solvent. The solvent can include an alcohol such as methyl alcohol, ethyl alcohol, isopropanol, or t-butanol. In alternative embodiments, the solvent includes an ester that includes at least one of ethyl acetate, dimethyl succinate, diethyl succinate, dimethyl adipate, or ethylene glycol diacetate.

In alternative embodiments, the compound is a solvent for a resin in the particulate material. The resin can include at least one of shellac, polyvinyl pyrrolidone, polyvinyl acetate, polyvinyl alcohol, polystyrene, styrene-butadiene copolymer, or acrylonitrile-butadiene-styrene copolymer.

Additionally, organic acids and sugars such as sucrose, dextrose, malic acid, and sodium citrate, and other compounds such as urea and hydrolized amino acids can be used as solutes in water solution. These compounds bind the particulate material together by drying in the powder, and not have any appreciable solvent character on their own.

The monomeric compound can include a mixed monomer vinyl-silane and can include vinyltriisopropoxysilane.

The acrylic monomer can include at least one of tri(propylene glycol) diacrylate, ethylene glycol phenyl ether acrylate, or 1,6 hexanediol diacrylate. The methacrylic monomer can include at least one of 1,3 butylene glycol dimethacrylate, neopentyl glycol dimethacrylate, butyl methacrylate, 1,6 hexanediol dimethacrylate, or di(propylene glycol) allyl ether methacrylate.

The compound can be curable, in combination with a photoinitiator in a solid, by ultraviolet radiation having a wavelength between about 320-500 nm and an energy density of about 1 joule/cm$^2$.

The particulate material can include a filler that includes an inorganic compound. In one embodiment, the filler includes at least one of clay, aluminum oxide, silicon dioxide, aluminum silicate, potassium aluminum silicate, calcium silicate, calcium hydroxide, calcium aluminate, calcium carbonate, sodium silicate, zinc oxide, titanium dioxide, or magnetite. A printing aid can be dispersed throughout the filler. The printing aid can include at least one of sorbitan trioleate, sorbitan mono-oleate, sorbitan monolaurate, polyoxyethylene sorbitan mono-oleate, polyethylene glycol, soybean oil, mineral oil, propylene glycol, fluroaklkyl polyoxyethylene polymers, glycerol triacetate, polypropylene glycol, ethylene glycol octanoate, ethylene glycol decanoate, ethoxylated derivatives of 2,4,7,9-Tetramethyl-5-decyne-4,7-diol, oleyl alcohol, or oleic acid.

A binder composition is also provided, which can include an adhesive in combination with a fluid, for selectively adhering particulate material to form a solid object in a three-dimensional printer. In one embodiment, the adhesive can include a nonaqueous organic monomeric compound.

In alternative embodiments, an adhesive for selectively adhering particulate material to form a solid object in a three-dimensional printer includes an anionically ionizable polymer consisting of compounds selected from the group including polymethacrylic acid, polymethacrylic acid sodium salt, and sodium polystyrene sulfonate.

In other embodiments, the adhesive includes a cationic polymer such as polyethyleneimine and polydiallyldimethylammonium chloride. In other embodiments, the adhesive includes a nonionic polymer. The polymer can include at least one of polyvinyl pyrrolidone, polyvinyl pyrrolidone copolymer with polyvinyl acetate, polyvinyl alcohol, polyvinyl methyl ether, polyacrylamide, or poly-2-ethyl-2-oxazoline. In yet other embodiments, the adhesive includes a polymer selected from the group consisting of polymethacrylic acid, polymethacrylic acid sodium salt, sodium polystyrene sulfonate, and polyethyleneimine.

In further embodiments, the adhesive includes a waterborne colloid such as polymethyl methacrylate, polystyrene, natural rubber, polyurethane, polyvinyl acetate, and alkyd resins. In yet other embodiments, the adhesive includes an inorganic solute selected from the group consisting of sodium polyphosphate, sodium tetraborate, sodium chloride, ammonium nitrate, potassium sulfate, ammonium chloride, and calcium formate.

The foregoing and other objects, features and advantages will be apparent from the following more particular description of embodiments, as illustrated in the accompanying drawings in which like reference characters refer to the same parts throughout the different views. The drawings are not necessarily to scale, emphasis instead being placed upon illustrating the principles of the invention.

DETAILED DESCRIPTION

A materials system for three-dimensional printing comprises a mixture of particles including a filler and possibly an adhesive. The materials system can also include a fibrous component, a printing aid for reducing edge curl due to uneven curing of the adhesive and resultant distortion of a part that is three-dimensionally printed, and an activating fluid comprising additional adhesive and a solvent that activates the adhesive. The activating fluid can also include such processing aids as a humectant, a flowrate enhancer, and a dye. The fluid activates the adhesive in the particulate mixture, adhesively bonding the material together to form an essentially solid article.

Figure 1:
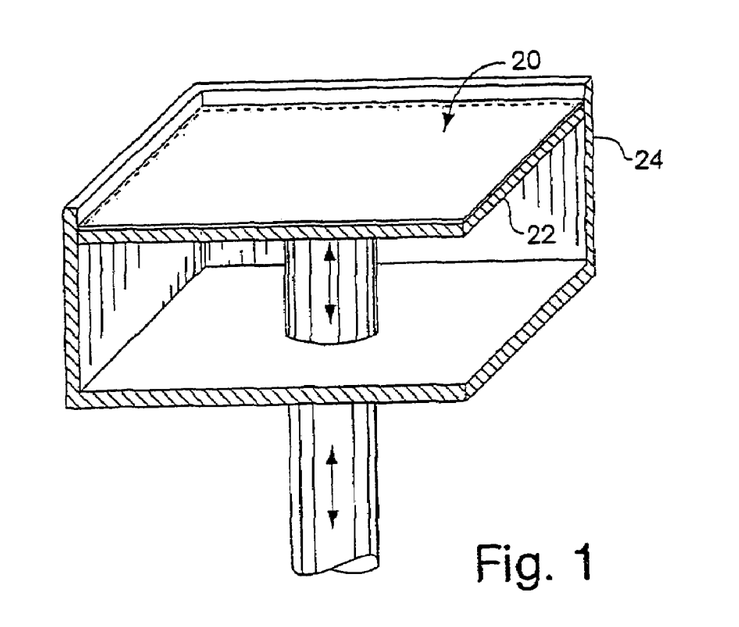
FIG. 1 schematically illustrates a first layer of a mixture of particulate material deposited onto a downwardly movable surface on which an article is to be built, before any fluid has been delivered.

FIG. 1 schematically illustrates a first layer of a mixture of particulate material deposited onto a downwardly movable surface on which an article is to be built, before any fluid has been delivered. According to the method, a layer or film of particulate material 20 is applied on a downwardly movable surface 22 of a container 24. The layer or film of particulate material can be formed in any manner; in one embodiment, the particulate material is applied using a counter roller. The particulate material applied to the surface includes a filler and, possibly, adhesive.

As used herein, "adhesive" is meant to define a component that forms the primary adhesive bonds in the mixture of material between portions of the mixture that were separate prior to delivery of the activating fluid. The adhesive can be included both in the particle mixture and in the activating fluid. As used herein, a "filler" is meant to define a component that is solid prior to application of the activating fluid, which is substantially less soluble in the fluid than the adhesive, and which gives structure to the final article.

According to a particular embodiment, the particulate mixture includes a reinforcing fiber, or a reinforcing fibrous component, added to provide structural reinforcement to the final article. The particulate material may include a plurality of particles of mean diameter of about 10-300 microns. As used herein, "fiber" or "fibrous component" is meant to define a component that is solid prior to application of the activating fluid, which can be but is not necessarily insoluble in the fluid, that is added to increase the final article strength. The reinforcing fiber length is restricted to a length approximately equal to the thickness of the layer of particulate mixture. The reinforcing fiber is typically about 60 to about 200 microns in length, and is included in an amount not greater than 20 percent, by weight, of the total mixture.

Additionally, a stabilizing fiber can be added to the filler to provide dimensional stability to the final article, as well as to slightly increase the article strength. Spreading the particulate mixture with the counter roller becomes increasingly difficult as friction caused by an excess of stabilizing fiber in the mixture increases, reducing the packing density. Restricting both the amount and length of the stabilizing fiber increases the packing density of the mixture resulting in finished parts of greater strength. The stabilizing fiber may be restricted to a length of less than half of the reinforcing fiber, in an amount not greater than 30 percent, by weight, of the total mixture. Optimal values can be determined with routine experimentation using, for example, a counter roller.

According to another particular embodiment, a printing aid in the form of an emulsifier, such as sorbitan trioleate (commercially available as SPAN 85 from Sigma Chemical Co., St. Louis, Mo., USA), can be added to the particulate mixture to prevent distortions in printing. The printing aid prevents fine particles of the mixture from becoming airborne while the fluid is dispensed from the print head which would distort the printed article. Lecithin, which also serves as a printing aid can be used as well.

The composition of the particulate mixture and fluid (binder) of a particular embodiment using a polymer solution as the adhesive is provided in Table 1, below. The composition of the particulate mixture and fluid (binder) of a particular embodiment using a colloidal suspension as the adhesive is provided in Table 2, below.

TABLE 1

| Ingredient | Particular Compound | Example Composition Range (W/W) | Example Composition (W/W) | Particle Size Range (μm) |
|---|---|---|---|---|
| Particulate Mixture | | | | |
| Adhesive | sucrose | 10-50% | 30% | 10 |
| Reinforcing Fiber | cellulose | 0-20% | 10% | 100 |
| Filler | maltodextrin (dextrose equivalent = 5) | 0-80% | 50% | <300 |
| Stabilizing Fiber | cellulose | 0-30% | 10% | 60 |
| Printing Aids | lecithin | 0-3% | 0.27% | N/A |
| | sorbitan trioleate | 0-3% | 0.03% | N/A |
| Fluid | | | | |
| Solvent | water | 20-88% | 68% | N/A |
| Solvent | isopropyl alcohol | 0-5% | 1% | N/A |
| water-sol. adhesive | sulfonated polystyrene | 10-50% | 25% | N/A |
| Humectant | glycerol | 0-15% | 5% | N/A |
| Flowrate Enhancer | diethylene glycol monobutyl ether | 0-10% | 1% | N/A |
| Dye | naphthol blue-black | 0-0.1% | 0.1% | N/A |

TABLE 2

| Ingredient | Particular Compound | Example Composition Range (W/W) | Example Composition (W/W) | Particle Size Range (μm) |
|---|---|---|---|---|
| Particulate Mixture | | | | |
| Adhesive | sucrose | 10-50% | 30% | 10 |
| Reinforcing Fiber | cellulose | 0-20% | 10% | 100 |
| Filler | maltodextrin (dextrose equivalent = 5) | 0-80% | 50% | <300 |
| Stabilizing Fiber | cellulose | 0-30% | 10% | 60 |
| Printing Aids | lecithin | 0-3% | 0.27% | N/A |
| | sorbitan trioleate | 0-3% | 0.03% | N/A |
| Fluid | | | | |
| Suspending Fluid | water | 20-88% | 72% | N/A |

TABLE 2-continued

| Ingredient | Particular Compound | Example Composition Range (W/W) | Example Composition (W/W) | Particle Size Range (μm) |
|---|---|---|---|---|
| Solvent | isopropyl alcohol | 0-5% | 1% | N/A |
| Colloid Adhesive | polyvinyl acetate | 10-50% | 20% | 50-500 nm |
| Inorganic Buffer | acetic acid | 0-2% | 1% | N/A |
| Humectant | glycerol | 0-15% | 5% | N/A |
| Flowrate Enhancer | diethylene glycol monobutyl ether | 0-10% | 1% | N/A |
| Dye | naphthol blue-black | 0-0.1% | 0.1% | N/A |

Figure 2:
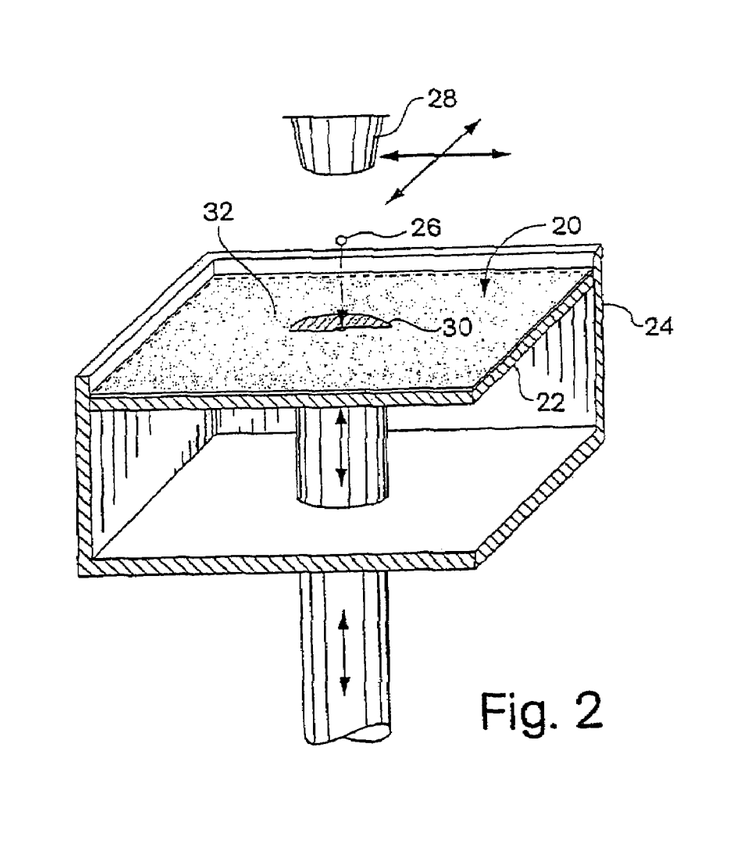
FIG. 2 schematically illustrates an electromechanical ink-jet nozzle delivering an activating fluid to a portion of the layer of particulate material of FIG. 1 in a predetermined pattern.

FIG. 2 schematically illustrates an electromechanical ink-jet nozzle delivering an activating fluid to a portion of the layer of particulate material of FIG. 1 in a predetermined pattern. The fluid 26 is delivered to the layer or film of particulate material in any predetermined two-dimensional pattern (circular, in the figures, for purposes of illustration only), using any convenient mechanism, such as a drop-on-demand (hereinafter "DOD") electromechanical printhead driven by customized software which receives data from a computer-assisted-design (hereinafter "CAD") system as described in greater detail in U.S. application Ser. No. 09/416,787, which is incorporated herein by reference in its entirety. Examples of suitable piezoelectric printheads include the Tektronix PHASOR 340 printhead by Xerox (Stanford, Conn., USA), the PJN 320 printhead from PicoJet, Inc. (Hillsboro, Oreg., USA), and the EPSON 900 printhead from Epson America, Inc. (Portland, Oreg., USA). A suitable solenoid valve printhead is the 1200 Hz INKA printhead from The Lee Co. (Westbrook, Conn., USA).

In one embodiment, where adhesive is mixed with the other particles, the first portion 30 of the particulate mixture is activated by the fluid, causing the activated adhesive to adhere the particles together to form an essentially-solid circular layer that becomes a cross-sectional portion of the final article. As used herein, "activates" is meant to define a change in state from essentially inert to adhesive. When the fluid initially comes into contact with the particulate mixture, it immediately flows outward (on the microscopic scale) from the point of impact by capillary action, dissolving the adhesive in the particulate mixture within the first few seconds. A typical droplet of activating fluid has a volume of about 50 pL, and spreads to about 100 microns once it comes into contact with the particulate mixture. As the solvent dissolves the adhesive, the fluid viscosity increases dramatically, arresting further migration of the fluid from the initial point of impact.

An adhesive can be dissolved, suspended, or otherwise included in the activating fluid before delivery, in addition to being in the powder mixture. The adhesive that is pre-mixed with the activating fluid will already be activated when delivered to the powder mixture and will adhere filler and other particles to form a solid, agglomerated structure, as described above.

Within a few minutes after the activating fluid is delivered to the particulate mixture, the fluid (with adhesive dissolved or suspended therein) infiltrates the less-soluble and slightly-porous particles, forming adhesive bonds between the filler and the fiber. The activating fluid is capable of bonding the particulate mixture in an agglomerated mass that is several times the mass of a droplet of the fluid. As volatile components of the fluid evaporate, the adhesive bonds harden, joining the filler and, optionally, fiber particulates into a rigid structure, which becomes a cross-sectional portion of the finished article.

Any portion of the particulate mixture 32 that was not exposed to the fluid remains loose and free-flowing on the movable surface. The unbound particulate mixture can be left in place until formation of the final article is complete. Leaving the unbound, loose-particulate mixture in place ensures that the article is supported during processing, allowing features such as overhangs, undercuts, and cavities (not illustrated, but conventional) to be defined without using support structures. After formation of the first cross-sectional portion of the final article, the movable surface is indexed downward.

Using, for example, a counter-rolling mechanism, a second film or layer of the particulate mixture is then applied over the first, covering both the rigid first cross-sectional portion, and any loose particulate mixture by which it is surrounded. A second application of fluid follows in the manner described above, forming adhesive bonds between a portion of the previous cross-sectional portion, the filler, and, optionally, fiber of the second layer, and hardening to form a second rigid cross-sectional portion added to the first rigid cross-sectional portion of the final article. The movable surface is again indexed downward.

The previous steps of applying a layer of particulate mixture, applying the fluid, and indexing the movable surface downward are repeated until the final article is completed.

Figure 3:
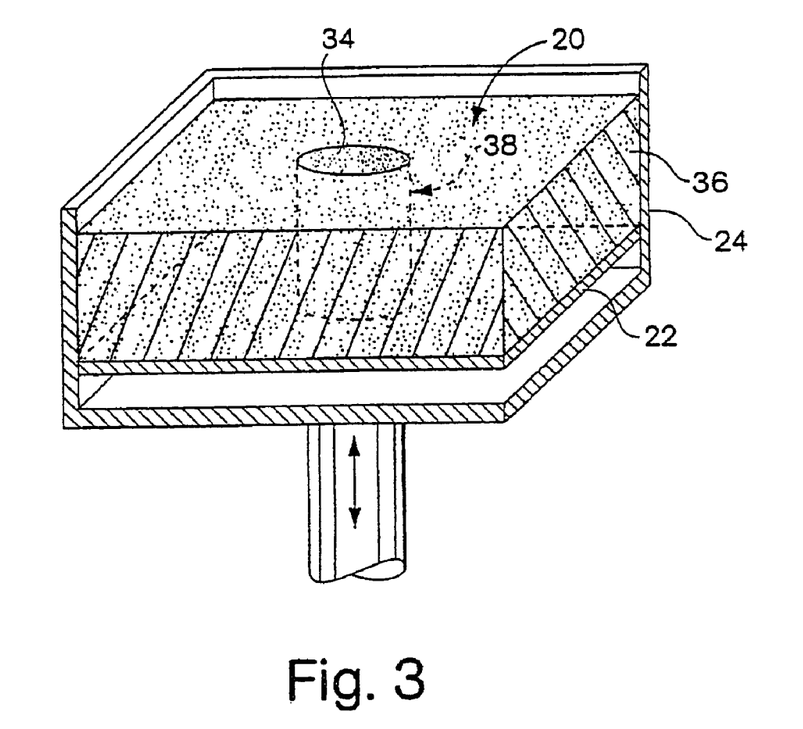
FIG. 3 schematically illustrates a view of a final article made from a series of steps illustrated in FIG. 2 enclosed in the container while it is still immersed in the loose unactivated particles.

FIG. 3 schematically illustrates a view of a final article made from a series of steps illustrated in FIG. 2 enclosed in the container while it is still immersed in the loose unactivated particles. The final article can be completely immersed in a bed 36 of unactivated particulate material. Alternatively, those skilled in this art would know how to build an article in layers upward from an immovable platform, by successively depositing, smoothing and printing a series of such layers.

Figure 4:
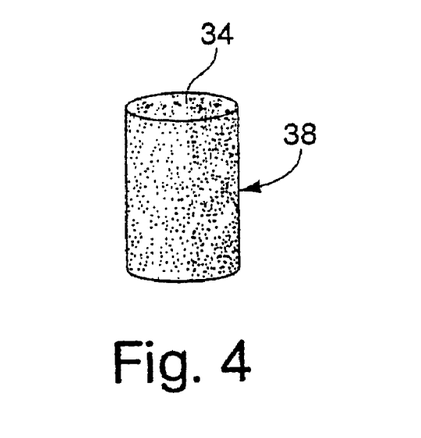
FIG. 4 schematically illustrates a view of the final article from FIG. 3.

FIG. 4 schematically illustrates a view of the final article from FIG. 3. The unactivated particulate material can be removed by blown air or a vacuum. After removal of the unactivated particulate material from the final article 38, post-processing treatment may be performed, including cleaning, infiltration with stabilizing materials, painting, etc.

The method of the present invention is capable of producing features on the order of about 250 μm. The accuracy achieved by the method of the present invention is in the range of about +/−250 μm. Shrinkage of the final article is about 1%, which can easily be factored into the build to increase accuracy.

Adhesive

The adhesive is a compound selected for the characteristics of high solubility in the activating fluid, low solution viscosity, low hygroscopicity, and high bonding strength. The adhesive should be highly soluble in the solvent in order to ensure that it is incorporated rapidly and completely into the activating fluid. Low solution viscosity can be used to ensure that activating fluid having adhesive dissolved therein will migrate quickly to sites in the powder bed to adhesively bond together the reinforcing materials. If the adhesive is naturally a solid, the adhesive can be milled as finely as possible prior to mixing with the filler and/or activating fluid and/or prior to coating the filler particles. The fine particle size enhances the available surface area, enhancing dissolution in the solvent, without being so fine as to cause "caking", an undesirable article characteristic. Typical adhesive particle grain sizes are about 5-50 μm. Low hygroscopicity of an adhesive used in the particulate mixture avoids absorption of excessive moisture from the air, which causes "caking", in which unactivated powder spuriously adheres to the outside surface of the part, resulting in poor surface definition.

Various types of adhesives that can be used with this invention are further and more specifically described under the section entitled, "Activating Fluid," below.

Filler

The filler of the present invention is a compound selected for the characteristics of insolubility in the activating fluid, or extremely low solubility in the activating fluid, rapid wetting, low hygroscopicity, and high bonding strength. The filler provides mechanical structure to the hardened composition. Sparingly soluble filler material is used in particular, although insoluble filler material can also be used. The filler particles become adhesively bonded together when the adhesive dries/hardens after the activating fluid has been applied. The filler can include a distribution of particle grain sizes, ranging from the practical maximum of about 200 µm downward, to the practical minimum of about 5 µm. Large grain sizes appear to improve the final article quality by forming large pores in the powder through which the fluid can migrate rapidly, permitting production of a more homogeneous material. Smaller grain sizes serve to reinforce article strength.

Compounds suitable for use as the filler of the present invention can be selected from the same general groups from which the adhesive is selected, provided that the solubility, hygroscopicity, bonding strength and solution viscosity criteria described above are met. Examples of such fillers, which can be used alone or in combination, include starches such as maltodextrin, clay, cellulose fiber, glass, limestone, gypsum, aluminum oxide, aluminum silicate, potassium aluminum silicate, calcium silicate, calcium hydroxide, calcium aluminate, and sodium silicate; metals; metal oxides such as zinc oxide, titanium dioxide, and magnetite ($Fe_3O_4$); carbides such as silicon carbide; and borides such as titanium diboride. In other embodiments, the filler is limestone, which can be used alone or in combination with other inorganic fillers. For example, the filler can be a combination of plaster (0-20%), limestone (calcium carbonate) (40-95%) and glass beads (0-80%). Generally the filler materials are selected on the basis of their ability to bond with the adhesive components, combined with the spreading characteristics of the dry powder. The selection of the solvent also typically determines which filler can be used.

Reinforcing Fiber

The reinforcing fiber can be insoluble or can dissolve substantially slower in the fluid than the adhesive dissolves. The reinforcing fiber is a stiff material chosen to increase the mechanical reinforcement and dimensional control of the final article without making the powder too difficult to spread. In order to promote wetting of the reinforcing fibers, the chosen fibers have a high affinity for the solvent. A particular embodiment includes a fiber length approximately equal to the layer thickness, which provides the greatest degree of mechanical reinforcement. Using longer fibers adversely affects the surface finish, and using too much fiber of any length can make spreading of the powder increasingly difficult. Fibrous material suitable for reinforcing the present invention includes, but is not limited to polymeric fiber, ceramic fiber, graphite fiber and fiberglass. The polymeric fiber may be cellulose and cellulose derivatives or substituted or unsubstituted, straight or branched, alkyl or alkene, including monomers up to eight carbon atoms in length. Specific useable fibrous materials include, but are not limited to cellulose fiber, silicon carbide fiber, graphite fiber, aluminosilicate fiber, polypropylene fiber, fiberglass, nylon, and rayon.

As indicated in Table 1, both the reinforcing fiber and the stabilizing fiber are can be cellulose. Some of the useful properties of cellulose making it particularly suitable for use in connection with the invention are low toxicity, biodegradability, low cost and availability in a wide variety of lengths.

Further considerations when selecting the adhesive, filler and fiber depend on the desired properties of the final article. The final strength of the finished article depends largely on the quality of the adhesive contacts between the particles of the mixture, and the size of the empty pores that persist in the material after the adhesive has hardened; both of these factors vary with the grain size of the particulate material. In general, the mean size of the grains of particulate material should not be larger than the layer thickness. A distribution of grain sizes increases the packing density of the particulate material, which in turn increases both article strength and dimensional control.

Printing Aid

As indicated in Table 1, sorbitan trioleate (SPAN 85) is used as a printing aid in the exemplary particulate mixture. Sorbitan trioleate is a liquid which is only slightly soluble in water. By adding a small amount to the powder, the sorbitan trioleate provides a light adhesion between powder grains before printing, thereby reducing dust formation. After printing, the sorbitan trioleate continues to adhere insoluble grains together for a short time until it dissolves. This effect tends to reduce distortion in printed layers in the brief time that is required for the adhesive to dissolve and redistribute in the powder. Hydrophillic grades of lecithin are particularly suitable. A wide variety of other liquid compounds work for the same purpose. Polypropylene glycol (PPG), especially with a molecular weight of about 400, and citronellol are two examples. Other suitable printing aides include ethylene glycol octanoate, ethylene glycol decanoate, and ethoxylated derivatives of 2,4,7,9-Tetramethyl-5-decyne-4,7-diol. Sorbitan trioleate can be used in combination with lethicin, which also functions as a printing aid. Other liquid compounds that can be used as printing aids include sorbitan mono-oleate, sorbitan monolaurate, polyoxyethylene sorbitan mono-oleate, polyethylene glycol, soybean oil, mineral oil, propylene glycol, fluroalkyl polyoxyethylene polymers, glycerol triacetate, oleyl alcohol, and oleic acid.

Activating Fluid

The fluid of the present invention is selected to comport with the degree of solubility required for the various particulate components of the mixture, as described above. The fluid includes a solvent in which the adhesive is active, particularly soluble, and can include processing aids such as a humectant, a flowrate enhancer, and a dye. An ideal solvent is one in which the adhesive component of the powder is highly soluble, and in which both the filler and fiber are substantially less soluble. The solvent can be aqueous or non-aqueous, although aqueous solvents offer some advantages. Suitable solvents can be selected from the following non-limiting list: water, methyl alcohol, ethyl alcohol, isopropanol, t-butanol, ethyl acetate, dimethyl succinate, diethyl succinate, dimethyl adipate, and ethylene glycol diacetate.

The activating fluid, which can have adhesive pre-mixed, is also referred to as the "binder." The function of the binder is to infiltrate the insoluble or semi-soluble particle mixture and to bond the grains together. The activating fluid, with adhesive included, can belong to any one of the following classes: (1) polymer solutions, (2) colloidal suspensions, (3) inorganic (salt) solutions, (4) organic monomeric solutions, (5)

non aqueous liquids. Classes 1-4 can be aqueous. The following description of particular fluids and adhesives are not meant to be limiting, other suitable compounds may be used in place of or in combination with the listed compounds.

There also exists a collection of water-based compounds that have been found to work particularly well in electromechanical printheads. In the first category, a water-soluble polymer can be dissolved in the binder to form a relatively low viscosity solution. Of these, there are a few particularly suitable polymers. These are anionically ionizable polymers, cationic polymers and nonionic polymers. The anionically ionizable polymers include polymethacrylic acid, polymethacrylic acid sodium salt, and sodium polystyrene sulfonate. The cationic polymers include polyethyleneimine and polydiallyldimethyl ammonium chloride. As a class, polyethyleneimine comes in two forms, linear and branched, both of which are useful. The nonionic soluble polymers that are particularly useful as binders are polyvinyl pyrrolidone, polyvinyl pyrrolidone copolymer with polyvinyl acetate, polyvinyl alcohol, polyvinyl methyl ether, polyacrylamide, and poly-2-ethyl-2-oxazoline.

In a typical embodiment, a low molecular weight polymer such as sodium polystyrene sulfonate is dissolved in water to form a solution containing approximately 20% solids by weight. A cosolvent such as isopropyl alcohol, at approximately 1% to 5% by weight, can modify the viscosity of the solution by controlling the conformation of the polymer chains in solution. A humectant such as glycerol used at approximately 5% to 10% will reduce the tendency of the binder to dry in the printhead. Other solution parameters such as pH and salt concentration may be used to modify flow properties. Added salts tend to lower the viscosity of binders that include a polyelectrolyte, such as sodium chloride, sodium phosphate, sodium sulfate, and potassium sulfate.

In the second category, colloidal suspensions of materials can be used as binders in three-dimensional printing. Organic latexes such as polymethyl methacrylate, polystyrene, styrenated polyacrylic acid, natural rubber, polyurethane latex, polyvinyl acetate latex, and alkyd resin latex are materials that can be applied to the process. Additionally, inorganic suspensions such as colloidal alumina, clay, and colloidal graphite could all be used to for solid articles containing substantial amounts of these technologically important materials. The advantage of using a colloid over a solution is that a very large content of solid materials can be suspended without greatly increasing the viscosity of the fluid.

The first two classes do not necessarily exclude one another. Very often, a soluble polyelectrolyte will be used to stabilize a suspension of solid particles. The polyelectrolyte will contribute to the structure of the finished article in addition to the dispersed particles.

A typical embodiment of a colloid-based binder comprises a polyvinyl acetate including approximately 30% solids. Additional additives such as triethanolamine at 2% to 5% by weight are used to control the pH of the suspension. Additionally, a humectant such as glycerol at 5% to 10% is used to reduce the tendency of the latex to dry in the printhead during idle periods.

In the third category, inorganic solutes can be dissolved in an aqueous solvent and printed as a binder. Glass-forming solutes such as sodium silicate, sodium polyphosphate and sodium tetraborate can be used to deposit a ceramic binder in a finished article. This ceramic binder could be fused in a subsequent heat treatment into a glass-bonded ceramic. Other inorganic solutes that could be printed include sodium chloride, ammonium nitrate, and potassium sulfate, ammonium chloride, and calcium formate.

Inorganic solutes participate in acid-base reactions. For example, sodium hydrogen phosphate solution could be printed onto powdered calcium carbonate. The acid binder etches the alkaline powder and forms calcium phosphate that recrystallizes and cements together the grains of powder. Another example is sodium silicate, which can be printed in a binder solution and can react with, for example, gypsum plaster to form calcium silicate.

In the fourth category, a solution of monomeric organic compounds can be printed through an electromechanical drop-on-demand printhead for three-dimensionally printed articles. These monomeric organic compounds generally fall into several broad classes: alcohols, esters, ethers, silanes, vinyl monomers, acrylic monomers, and methacrylate monomers.

Alcohols and esters that have been found to function well as the solvent phase, in addition to functioning as a solute in another solvent (usually water) are: methyl alcohol, ethyl alcohol, isopropanol, t-butanol, ethyl acetate, dimethyl succinate, diethyl succinate, dimethyl adipate, and ethylene glycol diacetate. These materials act as solvents for resins in the powder bed.

Resins that have been found to work in a 3-D printer are: shellac, polyvinyl pyrrolidone, polyvinyl acetate, polyvinyl alcohol, polystyrene, styrene-butadiene copolymer, and acrylonitrile-butadiene-styrene copolymer. These resins can be used in combination with any filler, or they can be used by themselves. A particularly suitable combination is 100% dimethyl succinate binder printed over a powder of 100% acrylonitrile-butadiene-styrene copolymer.

The other monomers contain active sites for polymerization, and possess mixed characteristics. The classes of polymerizable monomers are the vinyl monomers, acrylic monomers, and methacrylate monomers. A exemplary mixed vinyl-silane monomer is vinyltriisopropoxysilane. Acrylic monomers include tri(propylene glycol) diacrylate, ethylene glycol phenyl ether acrylate, and 1,6 hexanediol diacrylate. Methacrylates include 1,3 butylene glycol dimethacrylate, neopentyl glycol dimethacrylate, butyl methacrylate, 1,6 hexanediol dimethacrylate, and di(propylene glycol) allyl ether methacrylate.

In addition, there are some proprietary monomers of unknown character that have been found to print well. These are manufactured by Sartomer Co. of Exton, Pa., with designations SR 521, SR 516, and CN 131. These materials are reactive, and when mixed with a photoinitiator, they can be solidified by applying ultraviolet radiation. A particularly suitable binder formula for this polymerizable class is 99% neopentyl glycol dimethacrylate mixed with 1% of Sartomer product # KT046 as a photoinitiator. Any of the above-listed monomers can be made to work, but this formula yields a suitable flow through the printhead and suitable reactivity. The radiation necessary to cure these materials is ultraviolet light with a wavelength of 363-378 nm and an energy density of 1 joule/cm$^2$. A particularly suitable powder formula for this mixture is given in Table 1, above.

Additionally, there are organic acids and sugars: sucrose, dextrose, malic acid, and sodium citrate, and other compounds such as urea and the hydrolyzed amino acids that can be used as solutes in water solution. These compounds would bind by drying in the powder, and not have any appreciable solvent character on their own. In addition, reactive monomers, such as melamine-formaldehyde, can be printed in a liquid solution and later polymerized by heat, by an initiator, or by actinic radiation such as ultra-violet radiation.

The fifth class includes members that can be used with electromechanical printheads that are designed for printing molten wax, such as the Tektronix Phasor 340 printhead (which includes a temperature control). In this category, a room temperature solid such as wax can be used by itself or to replace water as a medium to convey the primary adhesives discussed in categories 1-4. The wax itself would serve as an adhesive to cement together powder particles. Binders formulated from these materials would be appropriate for electromechanical printheads that work at elevated temperatures. At these operating temperatures, the binder would become fluid and could then be used in the three-dimensional printing process.

Typical wax-based binder formulations would include waxes with a low melt viscosity (less than 100 centipoise) such as different grades of natural mineral, or refined waxes. Examples include but are not limited to carnauba wax beeswax, ceresine, ozokerite, montan, orlcury wax, paraffin, and microcrystalline wax. The waxes can be chemically modified to include reactive groups such as alcohols, organic acids, alcohol oxazolates, and urethane derivatives. To modify binder material properties such as melting point, melt viscosity, toughness and hardening rate, as well as to increase compatibility with added components, the waxes can be blended or compounded with resins, oils, and other polymers. Additional components include rosin, fatty acids, fatty acid salts, mono and diglycerides, mineral oils, and turpentines. Resins include polyethylene, polypropylene, polybutadiene, polyethylene oxide, polyethylene glycol, polymethyl methacrylate, poly-2-ethyl-oxazoline, polyvinylpyrrollidone, polyacrylamide, and polyvinyl alcohol.

Adhesives in members of the first class (polymer solutions) and the second class (inorganic-solutions) will often adsorb water if left exposed to ambient atmosphere. However, these adhesives will generally perform with greater reliability and efficacy if maintained in either a completely dry or wet state. By incorporating the adhesives in the liquid binder, they can thereby be maintained in a wet state and therefore exhibit the desired reliability and efficacy.

Humectant

A humectant can be included in the inventive mixture to retard evaporation of the solvent from the printed material, and to prevent drying/clogging of the printhead delivery system. Glycerol is a partcularly suitable humectant when the solvent is aqueous. Other polyhydric alcohols, including but not limited to ethylene glycol, diethylene glycol, and propylene glycol, are also known in the art to retard evaporation. Additional humectants include thiodiethanol, n-methyl pyrrolidinone, and dimethyl hydantoin.

Flowrate Enhancer

A flowrate enhancer can be included that has some humectant properties, but serves mainly to alter the hydrodynamic properties or wetting characteristics of the fluid to maximize the volume of fluid delivered by the printhead. Flowrate enhancement is thought to be a viscoelastic phenomena increasing the flow rate of the fluid, allowing thicker layers to be printed, thus allowing the final article to be built more quickly. Specific compounds that increase the flowrate of the fluid, either by reducing friction between the fluid and the walls of the jet, or by reducing the viscosity of the fluid, include ethylene glycol diacetate and potassium aluminum sulfate. Other suitable compounds for use as the flowrate enhancer can be selected from the following non-limiting list: tetraethylene glycol dimethylether, isopropyl alcohol, ethylene glycol monobutyl ether, diethylene glycol monobutyl ether, dodecyl dimethylammoniopropane sulfonate, glycerol triacetate, ethyl acetoacetate, and water-soluble polymers including polyvinyl pyrrolidone with a molecular weight of about 30,000 units, polyethylene glycol, polyacrylic acid, and sodium polyacrylate. For the ionic polymers, such as sodium polyacrylate, the increase in flow rate varies with pH. Salts that can be used to enhance flowrate include potassium sulfate, potassium aluminum sulfate, sodium hydrogen phosphate and sodium polyphosphate.

Dye

The fluid of the present invention can include a dye to provide a visual aid to the operator while building the article. The dye provides contrast between activated and unactivated powder which allows the operator to monitor the printed layers while building the article. The dye can be selected from the group including, but not limited to, naphthol blue-black and direct red. Other dyes that are compatible with the fluid can likewise be used.

Additional Ingredients in the Activating Fluid

Cosolvents can be added to an aqueous solution to alter the viscosity of a solution by altering the solvency of the liquid for the solute. Long-chain molecules in solution conform themselves either into extended chains or into coiled structures. If the solvent has a high affinity for the solute, long molecules will spread out causing the viscosity of the solution to be high. By adding a cosolvent to the solution, the polymer can be come less strongly attracted to other dissolved polymer molecules, and begin to coil into compact balls. This tends to reduce the viscosity of a polymer solution and allows more polymer to be dissolved. Cosolvents include isopropanol, ethyl alcohol, ethylene glycol monobutyl ether, butyrolactone and acetone.

Additives that control the pH of the binder, generally called buffers, can impart increased stability to the adhesive solutions and suspensions. Such materials include, but are not limited to, potassium hydroxide, ammonia, ammonium chloride, triethanolamine, sodium acetate, sodium gluconate, potassium sulfate, potassium hydrogen sulfate, sodium aluminum sulfate, and sodium tetraborate.

Wetting agents are substances that control the surface tension of a liquid. These can be used to modify the spreading of the liquid adhesive on the surfaces of the printhead mechanism. These include, but are not limited to, sodium dodecyl sulfate, sodium di-octyl sulfosuccinate, ethyl butyrate, diethylene glycol monobutyl ether, polyethylene glycol alkyl ether, and sodium p-toluene sulfonate.

Lubricants can be used to increase the rate at which liquid binder passes through the nozzles of a printhead. Depending on the materials of construction, substances such as glycerol triacetate, polyethylene oxide, polypropylene glycol, ethyl acetoacetate, diethyl succinate, and sodium polyacrylate can be used.

Additional substances can be used to promote the stability of suspensions. Stabilizers include emulsifiers such as sorbitan trioleate, polyoxyethylene mono-dodecyl ether, polyoxyethylene sorbitan mono-oleate, and protective colloids such as polyoxyethylene-co-polyoxypropylene, polyvinyl pyrrolidone, polyacrylic acid, gelatin, and acacia gum.

The equipment used in the method of the present invention is reliable, inexpensive, and easy to maintain, making it ideal for use in an office environment. The materials used in the present invention are capable of achieving much better performance in 3D Printing than those presently used in the liquid binder method. Thus, less equipment maintenance is required, and the reliability of the equipment is mcreased. Therefore, methods of the present invention can involve shorter build times and less labor than prior art methods.

Those skilled in the art will readily appreciate that all parameters listed herein are meant to be exemplary and actual parameters depend upon the specific application for which the methods and materials of the present invention are used. It is, therefore, to be understood that the foregoing embodiments are presented by way of example only and that, within the scope of the appended claims and equivalents thereto, the invention can be practiced otherwise than as specifically described.

What is claimed is:

1. A method for forming a solid object by three-dimensional printing, the method comprising the steps of:
   providing a chemical composition comprising a solvent including a nonaqueous organic monomeric compound selected from the group consisting of a silane, a vinyl monomer, an acrylic monomer, a methacrylate monomer, and combinations thereof; and
   depositing the chemical composition through a piezoelectric printhead onto a particulate material,
   wherein the chemical composition selectively adheres the particulate material to form the solid object.

2. A method for forming a solid object by three-dimensional printing, the method comprising the steps of:
   providing a chemical composition comprising a solvent; and
   depositing the chemical composition through an electromechanical printhead onto a particulate material,
   wherein the chemical composition selectively adheres the particulate material to form the solid object and the solvent comprises a mixed vinyl-silane monomer.

3. The method of claim 1, wherein the solvent is curable by ultraviolet radiation, in combination with a photoinitiator, to form the solid object.

4. The method of claim 1, wherein the particulate material comprises a resin and the composition comprises a solvent for the resin.

5. The method of claim 1, wherein the particulate material comprises a filler.

6. The method of claim 5, wherein the particulate material comprises a printing aid.

7. A method for forming a solid object by three-dimensional printing, the method comprising the steps of:
   providing a chemical composition comprising:
      an adhesive; and
      a fluid; and
   depositing the chemical composition through a piezoelectric printhead onto a particulate material
   wherein the chemical composition selectively adheres the particulate material to form the solid object and the adhesive comprises an inorganic solute selected from the group consisting of sodium silicate, sodium polyphosphate, sodium hydrogen phosphate, sodium hydrogen pyrophosphate, sodium tetraborate, ammonium hydrogen phosphate, sodium chloride, ammonium nitrate, potassium sulfate, ammonium chloride, calcium formate, and combinations thereof.

* * * * *